(12) United States Patent
Nadgouda

(10) Patent No.: US 8,776,243 B2
(45) Date of Patent: Jul. 8, 2014

(54) METHODS, SYSTEMS, AND COMPUTER READABLE MEDIA FOR COMBINING IP FRAGMENTATION EVASION TECHNIQUES

(75) Inventor: Anal A. Nadgouda, Bangalore (IN)

(73) Assignee: Ixia, Calabasas, CA (US)

( * ) Notice: Subject to any disclaimer, the term of this patent is extended or adjusted under 35 U.S.C. 154(b) by 13 days.

(21) Appl. No.: 13/458,045

(22) Filed: Apr. 27, 2012

(65) Prior Publication Data
US 2013/0291114 A1 Oct. 31, 2013

(51) Int. Cl.
*G06F 11/00* (2006.01)

(52) U.S. Cl.
USPC .......................................................... 726/25

(58) Field of Classification Search
None
See application file for complete search history.

(56) References Cited

U.S. PATENT DOCUMENTS

| | | | | |
|---|---|---|---|---|
| 8,463,860 | B1 * | 6/2013 | Guruswamy et al. | 709/206 |
| 2005/0028013 | A1 | 2/2005 | Cantrell et al. | |
| 2006/0130146 | A1 * | 6/2006 | Choi et al. | 726/25 |
| 2008/0104702 | A1 | 5/2008 | Choi et al. | |
| 2008/0127342 | A1 * | 5/2008 | Roesch et al. | 726/23 |
| 2009/0316698 | A1 | 12/2009 | Menten | |
| 2010/0125900 | A1 | 5/2010 | Dennerline et al. | |
| 2010/0162382 | A1 | 6/2010 | Kim et al. | |

OTHER PUBLICATIONS

Notification of Transmittal of the International Search Report and the Written Opinion of the International Searching Authority, or the Declaration for International Application No. PCT/US2013/038511 (Aug. 14, 2013).

* cited by examiner

*Primary Examiner* — Brandon Hoffman
(74) *Attorney, Agent, or Firm* — Jenkins, Wilson, Taylor & Hunt, P.A.

(57) ABSTRACT

Methods, systems, and computer readable media for combining IP fragmentation evasion techniques are disclosed. According to one aspect, the subject matter described herein includes a method for combining IP fragmentation evasion techniques. In a packet network test device, a plurality of IP fragmentation evasion techniques are defined. An IP packet is generated and fragmented into a first set of IP packet fragments. To the first set of IP packet fragments, each of the multiple IP fragmentation evasion techniques are applied. This produces a second set of IP packet fragments, which are transmitted to the device under test.

17 Claims, 5 Drawing Sheets

METHODS, SYSTEMS, AND COMPUTER READABLE MEDIA FOR COMBINING IP FRAGMENTATION EVASION TECHNIQUES

TECHNICAL FIELD

The subject matter described herein relates to methods and systems for testing the security effectiveness of network devices to block Internet protocol (IP) packet attacks. More particularly, the subject matter described herein relates to methods, systems, and computer readable media for combining IP fragmentation evasion techniques.

BACKGROUND

A large portion of global networks, such as the Internet, and local networks as well are packet networks that use the Internet protocol. In response to the increase of malware and network-based attacks, the use of security devices such as firewalls, intrusion detection devices, and malicious traffic detection devices has increased. Before these network security devices can block malicious packets, they must first identify the packets as malicious, either based on the packet source or the packet contents.

Knowing this, sources of malicious traffic have discovered that some network security devices become confused and unable to properly identify packets as having malicious content if those packets are fragmented and then reordered, resent as duplicates, and/or resent as nulls. Some network security devices are unable to properly identify malicious content within packets that have been deliberately fragmented into packets which overlap each other. Thus, makers of network security devices desire the ability to test their devices' effectiveness against attacks that use these IP fragmentation evasion techniques. Therefore, there exists a need for test equipment that can generate data traffic that replicates these IP fragmentation evasion techniques.

Furthermore, the IP fragmentation evasion techniques are not mutually exclusive of each other. For example, a source of malicious traffic may break the packet that contains the malicious payload into fragments, some or all of which may overlap other fragments, and also reorder those fragments, and also resend some or all of the fragments as duplicates, and also resend some or all of the fragments as nulls. As a result, a network security device must be able to robustly handle a dizzying array of scenarios, each scenario having a different mix of packets that are received by the network security device in different orders and having different content. Thus, makers of network security devices desire the ability to test their devices' effectiveness against all possible combinations of these (and other) IP fragmentation evasion techniques.

Accordingly, there exists a need for methods, systems, and computer readable media for combining IP fragmentation evasion techniques.

SUMMARY

According to one aspect, the subject matter described herein includes a method for combining IP fragmentation evasion techniques. The method includes, in a packet network test device, defining a plurality of IP fragmentation evasion techniques, generating an IP packet, and fragmenting the IP packet to produce a first set of IP packet fragments. The method also includes applying each of multiple IP fragmentation evasion techniques to the first set of IP packet fragments to produce a second set of IP packet fragments and transmitting the second set of IP packet fragments to the device under test.

According to another aspect, the subject matter described herein includes a system for combining IP fragmentation evasion techniques. The system includes a packet network test device having a packet generation and fragmentation module for generating an IP packet and fragmenting the IP packet to produce a first set of IP packet fragments, a fragmentation evasion module for receiving the first set of IP packet fragments and applying a plurality of IP fragmentation evasion techniques to produce a second set of IP packet fragments for transmission to a device under test, and a network interface for transmitting the packet fragments to a device under test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for combining IP fragmentation evasion techniques are provided.

Reference will now be made in detail to exemplary embodiments of the present invention, examples of which are illustrated in the accompanying drawings. Wherever possible, the same reference numbers will be used throughout the drawings to refer to the same or like parts.

Figure 1:
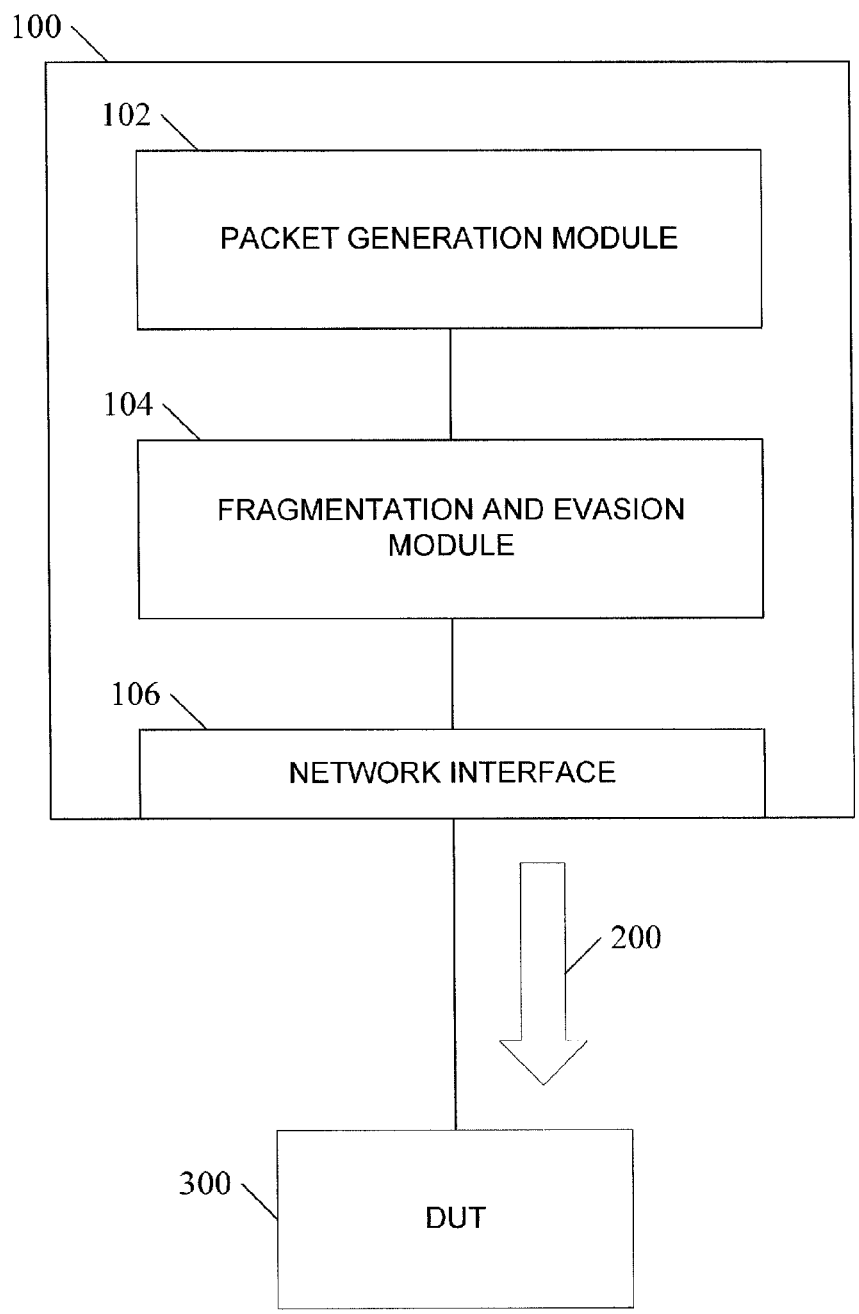
FIG. 1 is a block diagram illustrating an exemplary system for combining IP fragmentation evasion techniques according to an embodiment of the subject matter described herein.

FIG. 1 is a block diagram illustrating an exemplary system for combining IP fragmentation evasion techniques according to an embodiment of the subject matter described herein. In the embodiment illustrated in FIG. 1, a packet network test device 100 includes a packet generation module 102 for generating an IP packet, a fragmentation and evasion module 104 for fragmenting the IP packet to produce a first set of IP packet fragments and then applying a plurality of IP fragmentation evasion techniques to produce a second set of IP packet fragments for transmission to a device under test, and a network interface 106 for transmitting the packet fragments 108 to a device under test 110.

For the purposes of illustration and not limitation, four IP fragmentation evasion techniques will now be described. A simplistic example of a malicious packet would be a packet containing the word "MALWARE". A simplistic example of a network security device would be a device which examines every incoming packet and searches for the string "MALWARE" within the packet; if the word MALWARE is detected, the packet is blocked or discarded. However, this simplistic approach by the network security device can be fooled by simple fragmentation of the packet.

Fragmentation.

In this technique, a single packet containing the string "MALWARE" is split into two fragments, the first fragment containing "MALW" and the second fragment containing "ARE". The simplistic network security device would examine each packet, see that neither contained the string "MALWARE", and forward them to their destination, where they would be reassembled into the object that the network security device was trying to block.

Fragmentation and Reordering.

In this example, a second, more intelligent network security device may keep a rotating buffer of packet data from a particular source. This type of security device would not be fooled by the simple fragmentation described above, since it would store a copy of first packet's payload, "MALW", append a copy of the second packet's payload, "ARE", analyze the stored copies, detect that the combined fragments make "MALWARE", and reject the packets. However, if the packets were also reordered by the malicious source, this second type of security device would buffer the packets in the order that they were received, see that the buffer contained the string "AREMALW", which does not match the target string "MALWARE", and allow the packets to proceed to their destination. At the destination, the packets would be reassembled in the right order to produce MALWARE, the object that the network security device was trying to block.

Fragmentation with Duplication.

A third, even more intelligent type of network security device may buffer and reassemble incoming packets according to the packet sequence numbers contained in the packet headers. Such a device would receive the first and second packets in the example above and reassemble them in order to produce "MALWARE", which would then be properly detected and rejected. However, if a malicious source sends some of the fragments multiple times, such as sending a first packet containing "MALW", a second packet containing "MALW", a third packet containing "ARE", and a fourth packet containing "ARE", the third type of network security device may naively reassemble the packets according to their header sequence to produce "MALWMALWAREARE", which does not match the target string "MALWARE", and allow the packets to proceed to their destination. Unlike the naïve network security device in this example, the destination may detect that the second and fourth packets are duplicates and discard them, resulting in the reception of the string "MALWARE".

Fragmentation and Null Insertion.

A fourth type of network security device may buffer and reassemble incoming packets and may also detect duplicate fragments. Even this type of device may be fooled by the insertion of null fragments. For example, a malicious source may send three packet fragments, respectively containing "MALW", " " (i.e., a null packet), and "ARE", where the first and second packets are both identified as being first in a sequence and the third packet is identified as being second in a sequence. The fourth type of network security device may receive the first packet, store it in the buffer, which now contains "MALW"; receive the second packet, replace the contents of buffer with " "; and receive the third packet, add its contents to the buffer, which now contains "ARE". Since "ARE" does not match "MALWARE", this fourth type of network security device may allow all three packets to proceed to their destination. Unlike the naïve network security device in this example, the destination may accept the first packet, discard the null packet, and accept the third packet, thus accepting the string "MALWARE".

Another technique using null fragments is to tweak the "time to live" (TTL) value in the IP header of the null fragments such that by the time the null fragments reach the destination the TTL value is zero, which causes the destination to discard the packet. For example, a malicious source may send packets containing "MAL" (TTL>0), "<NULL> (TTL=0)", "WARE (TTL>0)", and "<NULL> (TTL=0)". If the TTL values are set so that by the time the packets are received at a network security device, the TTL values are greater than zero, the network security device may naively forward all packets to the destination. However, by the time the packets reach the destination, the <NULL> packets have zero lifetime left, i.e., TTL=0, and are discarded, while the packets containing "MAL" and "WARE" have a TTL value>0 and are not discarded.

Fragmentation and Overlap.

Another IP fragmentation evasion technique involves sending packet fragments which deliberately overlap each other such that each fragment fails to contain the complete search target, but will be reassembled at the receiver to create the malicious message. This technique makes use of information within the IP header of the fragment that indicates where the fragment's data should be placed in the combined packet. In an example of normal (non-malicious) operation, the string "PAYLOAD" might be split into fragments such as these:

Fragment 1: "PAY"; offset=0
Fragment 2: "LO"; offset=3
Fragment 3: "AD"; offset=5

The receiving end would reassemble them in this manner:

| | |
|---|---|
| Initial buffer contents: | _ _ _ _ _ _ _ |
| After receiving fragment 1: | P A Y _ _ _ _ _ |
| After receiving fragment 2: | P A Y L O _ _ _ |
| After receiving fragment 3: | P A Y L O A D _ _ |

However, a malicious source may try to hide the fact that it is sending "MALWARE" to the destination by creating fragments that look like these:

Fragment 1: "MALrst"; offset=0
Fragment 2: "WAuv"; offset=3
Fragment 3: "RE"; offset=5

At the receiving end, they would be reassembled in this manner:

| Initial buffer contents: | _ _ _ _ _ _ _ _ |
| After receiving fragment 1: | M A L r s t _ _ _ _ |
| After receiving fragment 2: | M A L W A u v _ _ |
| After receiving fragment 3: | M A L W A R E _ _ |

If the network security device does not consider offset but instead only considers sequence, the network security device would naively reassemble the fragments to create "MALrst-WAuvRE", which does not match "MALWARE", and forward the packets to the destination, which may correctly reassemble them as shown above to create MALWARE.

The success of the IP fragmentation evasion techniques in some ways depends upon the sophistication of the network security device. If the network security device is less sophisticated that the destination device at reassembling fragments, considering sequence, considering offset, etc., then malicious packets may slip past the network security device yet cause damage at the destination device. Unlike a single destination device, however, network security devices may be required to maintain state information on hundreds or thousands of connections at a time, and so typically are not as sophisticated or as fully featured as the destination devices.

Nevertheless, there is a trend toward increasing the functionality and intelligence of network security devices. A critical part of this process is testing and verification of the network security device. In the systems and methods according to embodiments of the subject matter described herein, a user may select one or more IP fragmentation evasion techniques from a list of such techniques and generate a packet stream that incorporates multiple evasion techniques. In one embodiment, these systems and methods allow the order in which the techniques should be applied to be specified.

Thus, in one embodiment, packet network test device 100 may provide an interface for allowing a user to specify which IP fragmentation evasion techniques to apply and/or the order in which they should be applied. An example of such a user interface is shown in FIG. 2.

Figure 2:
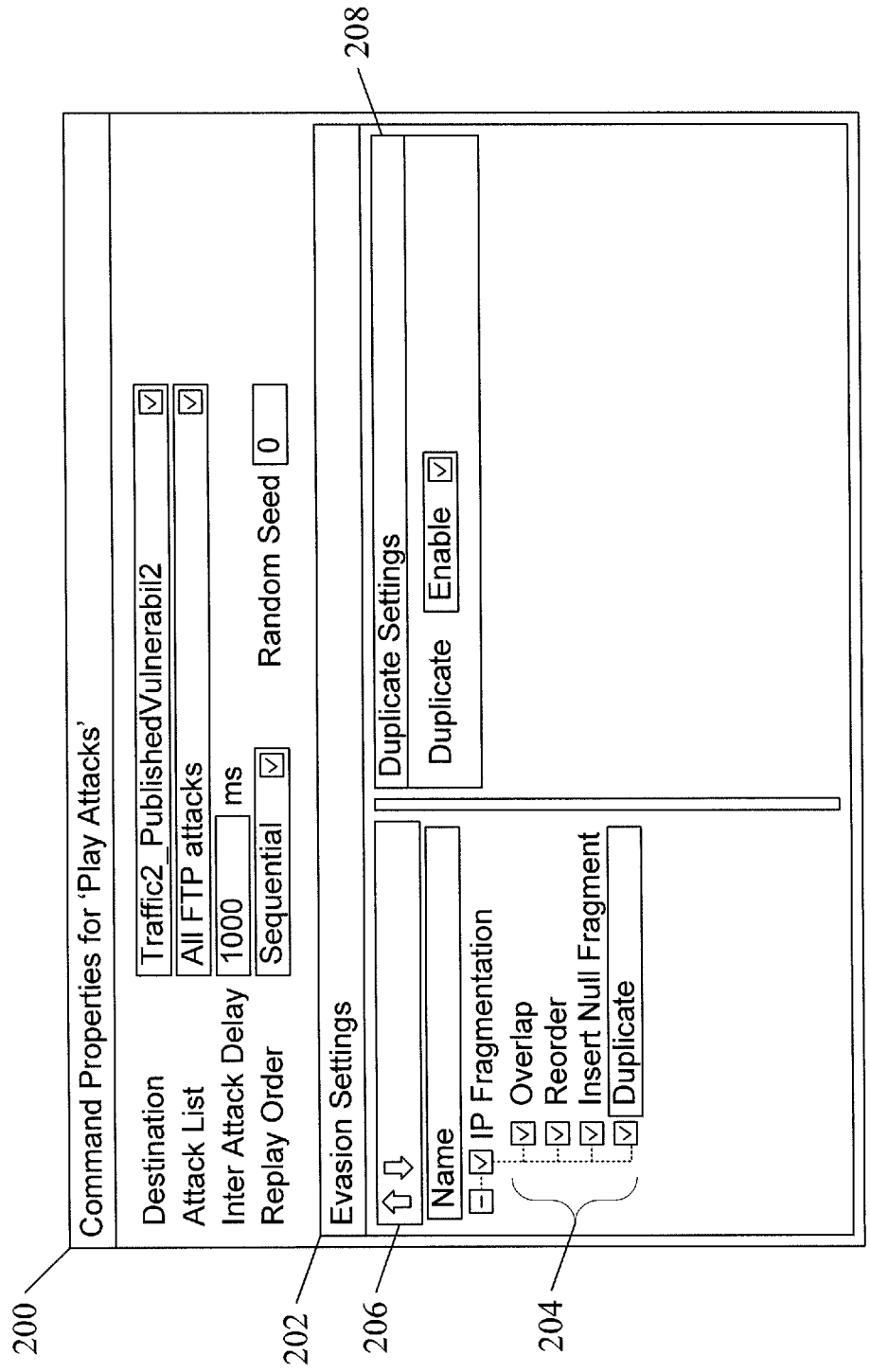
FIG. 2 is a view of an exemplary graphic user interface for allowing a user to specify multiple IP fragmentation evasion techniques to be applied and to define an order in which the specified techniques will be applied to produce a set of packet fragments to be transmitted to a device under test according to an embodiment of the subject matter described herein.

FIG. 2 is a view of an exemplary graphic user interface for allowing a user to specify multiple IP fragmentation evasion techniques to be applied and to define an order in which the specified techniques will be applied to produce a set of packet fragments to be transmitted to a device under test. The user interface may present an IP fragmentation evasion configuration pane 200 allows a user to define properties for a test suite that includes transmission of a set of packet fragments to a device under test.

In the embodiment illustrated in FIG. 2, for example, a user is defining a test condition or test suite called 'Play Attacks'. In the upper portion of pane 200, the user may specify a destination for the packets that will be created, an attack list that defines or describes the type of traffic to generate, at a high level (e.g., FTP only, HTTP only, FTP+HTTP, etc.) or a low level (e.g., TCP only, UDP only, TCP+UDP, etc.) An inter-attack delay field and a replay order field control how the generated packets are transmitted to the device under test, and so on. In one embodiment, a random number generator may get the seed for a random number calculation from a random seed field. Other types of information may be provided.

In the embodiment illustrated in FIG. 2, configuration pane 200 includes a lower portion 202, called Evasion Settings, where a user may select the IP fragmentation evasion techniques to be used. Within section 202 a user may select from a list of IP fragmentation evasion techniques 204, shown here in tree form, and may use arrows 206 to change the order in which the selected techniques will be applied to generate the set of packet fragments that will be ultimately transmitted to the device under test. In the embodiment illustrated in FIG. 2, a user has selected all four IP fragmentation evasion techniques, and has put them in the following order: {OVERLAP, REORDER, NULL, DUP}.

In one embodiment, the user may be able to modify configurable attributes of a particular evasion technique. In the embodiment illustrated in FIG. 2, for example, the user has selected the DUP technique. A settings pane 208 may display additional settings or configurable behaviors for this technique. Here, the only setting for the DUP technique is whether it is enabled or not enabled, but other techniques may have different numbers of settings. For example, the OVERLAP technique generates multiple packet fragments that, when reassembled, will overlap each other. In one embodiment, configuration settings for the OVERLAP technique could include how the size of the overlap is calculated, such as: constant (e.g., always the same amount of overlap), random (e.g., random amount of overlap), and fixed (e.g., not constant, but changing in a fixed order or sequence.) Likewise, a NULL technique may include a variable that allows the user to configure the TTL values of the null packets to see if the device under test detects and blocks exploits that include manipulation of these values.

Figure 3:
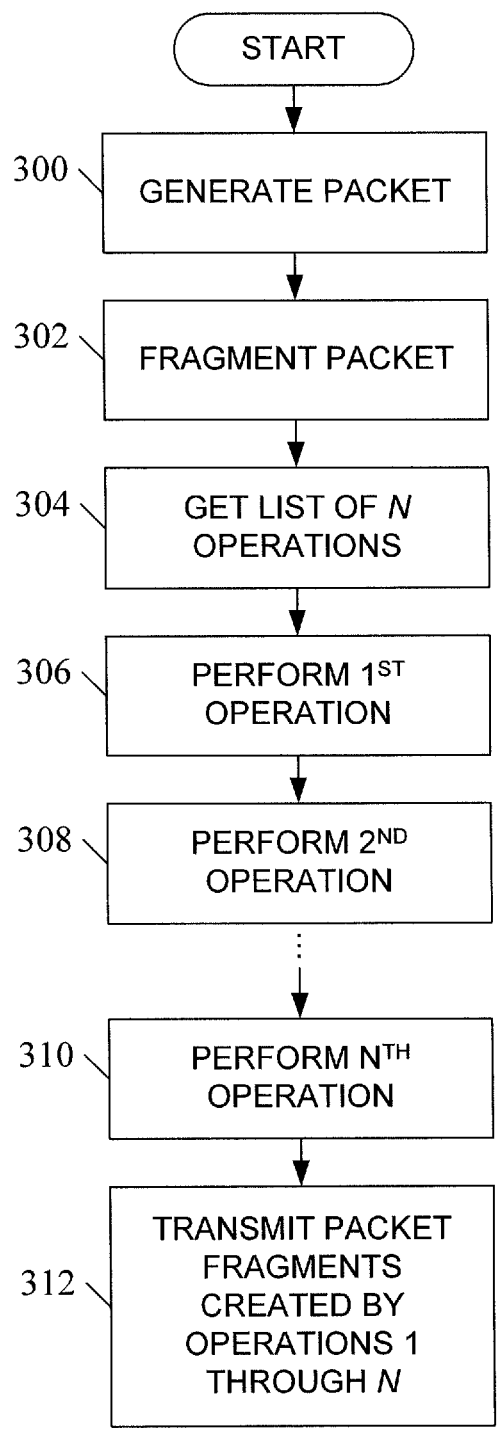
FIG. 3 is a flow chart a flow chart illustrating an exemplary system for combining IP fragmentation evasion techniques according to an embodiment of the subject matter described herein.

FIG. 3 is a flow chart illustrating an exemplary system for combining IP fragmentation evasion techniques according to an embodiment of the subject matter described herein. In the embodiment illustrated in FIG. 3, a packet is generated (step 300) and then fragmented (step 302) to produce a first set of packet fragments. The method includes getting a list of N operations, where N is an integer greater than 1 (step 304) and where each operation is the application of an IP fragmentation evasion technique to an input set of packet fragments to produce an output set of packet fragments, and applying the operations in order to produce a second set of packet fragments.

In the embodiment illustrated in FIG. 3, for example, at step 306 a first IP fragmentation evasion technique is applied to the first set of packet fragments to produce a second set of packet fragments. At step 308, a second IP fragmentation evasion technique is applied to the second set of packet fragments to produce a third set of packet fragments. These operations continue, where each operation j involves performing a $j^{th}$ IP fragmentation evasion technique to the $j^{th}$ set of packet fragments to produce a $(j+1)^{th}$ set of packet fragments, until step 310, at which the $N^{th}$ IP fragmentation evasion technique is applied to the $N^{th}$ set of packet fragments to produce the second set of packet fragments. At step 312 the second set of packet fragments is then transmitted to the device under test.

Referring to system 100 in FIG. 1, for example, packet generation module 102 may perform step 300, and then send the generated packet to fragmentation and evasion module 104, which performs steps 302, 304, 306, 308, and 310. Fragmentation and evasion module 104 may send the resulting set of packets to network interface 108, which performs step 312, sending the packets 108 to device under test 110.

Figure 4A:
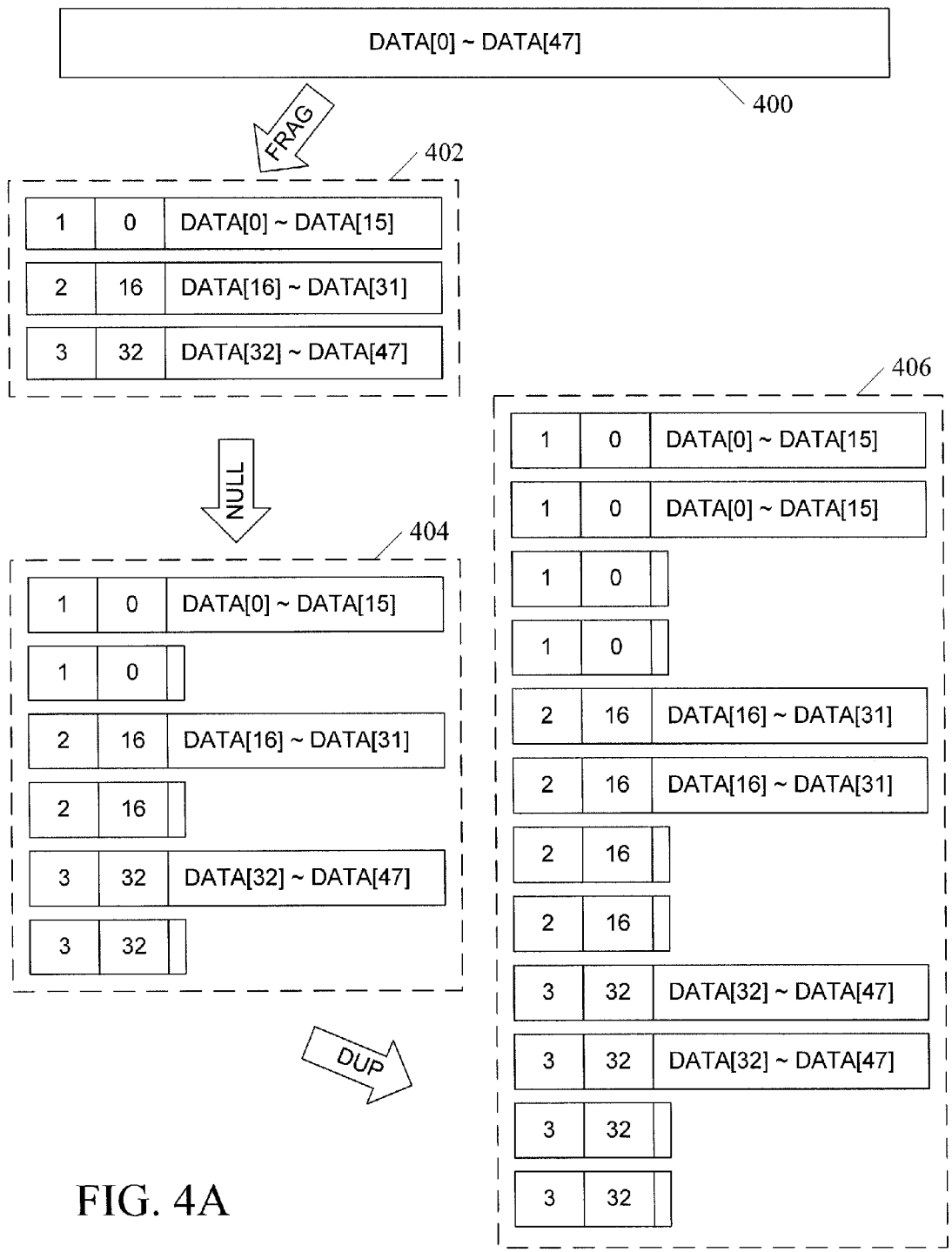
FIGS. 4A and 4B illustrate how changing the order of application of the IP fragmentation evasion techniques affects order of packet traffic that is produced by systems and methods according to an embodiment of the subject matter described herein.
Figure 4B:
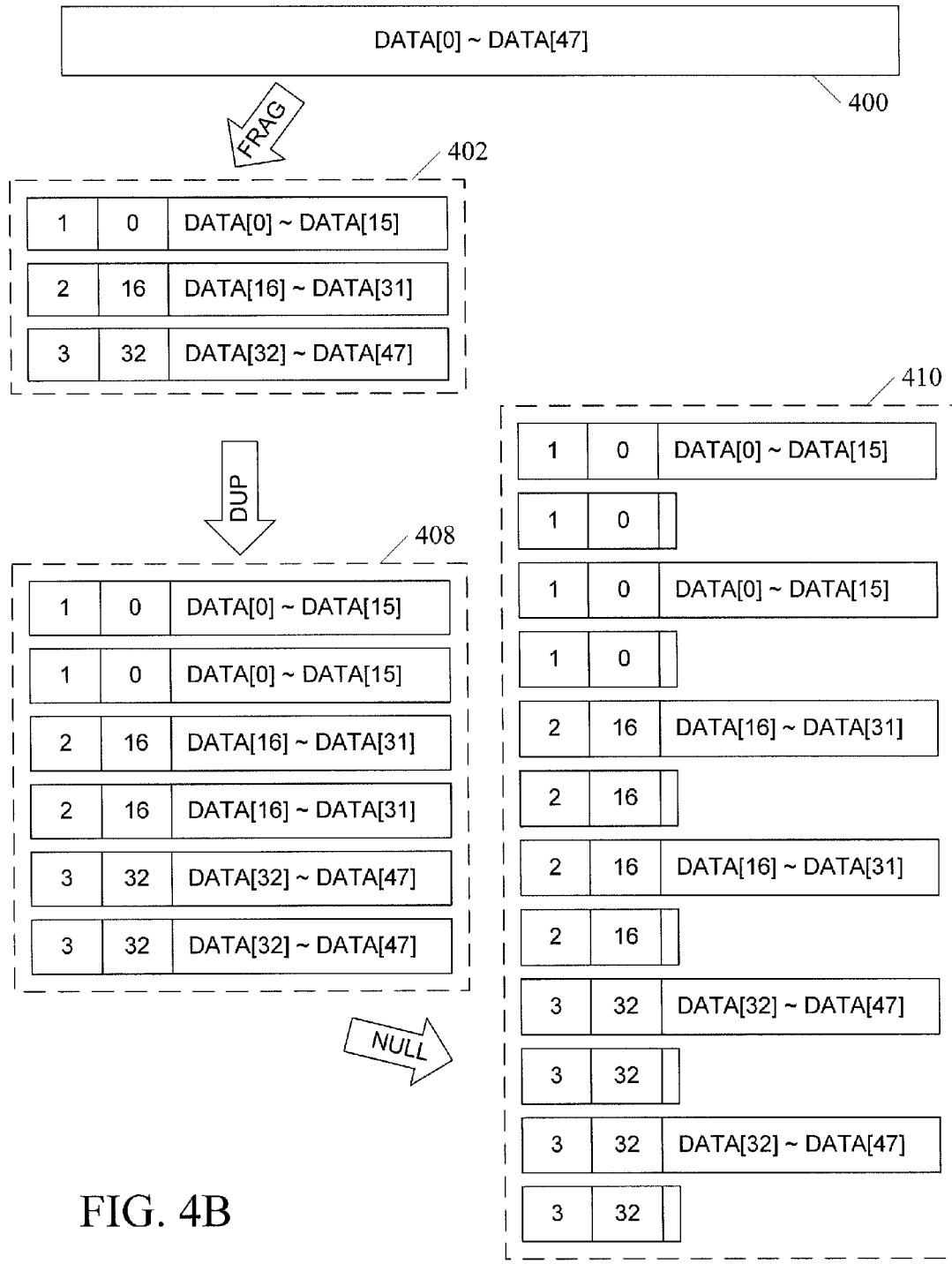

FIGS. 4A and 4B illustrate how changing the order of application of the IP fragmentation evasion techniques affects order of packet traffic that is produced. In both of FIGS. 4A and 4B, two IP fragmentation evasion techniques—generate null fragments (NULL) and generate duplicate fragments (DUP)—have been selected by a user. However, in FIG. 4A, the user has selected the order {NULL, DUP}, while in FIG. 4B, the user has selected the order {DUP, NULL}.

Referring to FIG. 4A, a packet 400 is fragmented into a first set of packet fragments 402. For simplicity of illustration, each packet fragment has a packet ID, a data offset, and a packet payload. For example, the top packet in set 402 has a packet with a packet ID=1, a data offset=0, and a data payload containing a subset of the original packet 400, the data DATA [0] through DATA[15]. The next packet has a packet ID=2, a data offset=16, and a data payload containing DATA[16] through DATA[31]. The last packet has a packet ID=3, a data offset=32, and a data payload containing DATA[32] through DATA[47]. The "generate null fragments" technique is applied to the first set of packet fragments 402 to produce a second set of packet fragments 404, which include null fragments interspersed between the non-null fragments. Next, the "generate duplicate fragments" technique is applied to the second set of packet fragments 404 to produce a third set of packet fragments 406, which contains a duplicate of every packet fragment that existed within packet fragments 404.

Turning now to FIG. 4B, packet 400 is fragmented into a first set of packet fragments 402, but here, the "generate duplicate fragments" technique is applied first, producing the set of packet fragments 408, and the "generate null fragments" technique is applied next, producing the set of packet fragments 410. I can be seen that the output of the sequence {NULL, DUP} shown in set 406 is different from the output of the sequence {DUP, NULL} shown in set 410. A device under test should be able to properly handle both of these distinct sequences.

The same principles apply to other combinations of IP fragmentation evasion sequences. For example, an OVERLAP sequence may take a set of packet fragments and generate overlapping packet fragments, where the valid data is right-padded, left-padded, or both, by junk data. In one embodiment, a user may define the amount (if any) of right padding and/or left padding. In one embodiment, for example, a user may specify that the amount of padding is a specified sequence, such as {1, 2, 4, 8, 16} repeating. In this example, applying the OVERLAP sequence before the DUP sequence will produce a different result than applying the DUP sequence before the OVERLAP sequence: applying {OVERLAP, DUP} will result in packet fragments having junk sequences of length 1, 1, 2, 2, 4, 4, . . . etc., while applying {DUP, OVERLAP} will result in packet fragments having junk sequences of length 1, 2, 4, 8, 16, 1, . . . etc.

Furthermore, the same principles may also be applied to IP fragmentation techniques other than the ones described above, and may also be applied to applications other than network security testing and to devices other than packet network test devices.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for combining IP fragmentation evasion techniques, the method comprising:
in a packet network test device:
defining a plurality of IP fragmentation evasion techniques;
generating an IP packet;
fragmenting the IP packet to produce a first set of IP packet fragments;
applying each of the plurality of IP fragmentation evasion techniques to the first set of IP packet fragments to produce a second set of IP packet fragments; and
transmitting the second set of IP packet fragments to the device under test.

2. The method of claim 1 wherein the plurality of IP fragmentation evasion techniques comprises at least two of:
a fragment reordering technique;
a fragment duplication technique;
a null fragment generation technique; and
a fragment overlap technique.

3. The method of claim 1 wherein the plurality of IP fragmentation evasion techniques are applied sequentially such that the packets produced as output from an $(i)^{th}$ IP fragmentation evasion technique are provided as input to an $(i+1)^{th}$ IP fragmentation evasion technique.

4. The method of claim 1 comprising providing for user selection of the plurality of IP fragmentation techniques to be applied.

5. The method of claim 1 comprising defining an order in which the plurality of IP fragmentation evasion techniques is applied to the first set of IP packet fragments and applying the plurality of IP fragmentation evasion techniques according to the defined order.

6. The method of claim 5 comprising providing for user definition of the order in which the plurality of IP fragmentation evasion techniques is applied to the first set of IP packet fragments.

7. The method of claim 6 wherein providing for user definition of the order in which the plurality of IP fragmentation evasion techniques is applied to the first set of IP packet fragments includes providing a user interface that allows definition of the order.

8. The method of claim 5 comprising providing for static, dynamic, or algorithmic definition of the order in which the plurality of IP fragmentation evasion techniques is applied.

9. A system for combining IP fragmentation evasion techniques, the system comprising:
a packet network test device including:
a packet generation module for generating an IP packet;
a fragmentation and evasion module for receiving the generated IP packet, fragmenting the IP packet to produce a first set of IP packet fragments, and applying a plurality of IP fragmentation evasion techniques to produce a second set of IP packet fragments for transmission to a device under test; and
a network interface for transmitting the packet fragments to a device under test.

10. The system of claim 9 wherein the plurality of IP fragmentation evasion techniques comprises at least two of:
a fragment reordering technique;
a fragment duplication technique;
a null fragment generation technique; and
a fragment overlap technique.

11. The system of claim 9 wherein the plurality of IP fragmentation evasion techniques are applied sequentially such that the packets produced as output from an $(i)^{th}$ IP fragmentation evasion technique are provided as input to an $(i+1)^{th}$ IP fragmentation evasion technique.

12. The system of claim 9 comprising an interface providing for user selection of the plurality of IP fragmentation techniques to be applied.

13. The system of claim 9 wherein the second module applies the plurality of IP fragmentation evasion techniques according to a defined order.

14. The system of claim 13 comprising an interface providing for user definition of the order in which the plurality of IP fragmentation evasion techniques is applied.

15. The system of claim 13 comprising an interface providing for static, dynamic, or algorithmic definition of the order in which the plurality of IP fragmentation evasion techniques is applied.

16. The system of claim 9 comprising an interface providing for at least one of:
- user specification of the plurality of IP fragmentation evasion techniques to be applied to produce the second set of IP packet fragments for transmission to a device under test; and
- user definition of an order in which the plurality of IP fragmentation evasion techniques is to be applied to produce the second set of IP packet fragments for transmission to a device under test.

17. A non-transitory computer readable medium having stored thereon executable instructions that when executed by the processor of a computer control the computer to perform steps comprising:
- defining a plurality of IP fragmentation evasion techniques;
- generating an IP packet;
- fragmenting the IP packet to produce a first set of IP packet fragments; and
- applying each of the plurality of IP fragmentation evasion techniques to the first set of IP packet fragments to produce a second set of IP packet fragments for transmission to a device under test.

* * * * *